United States Patent
Hu et al.

(10) Patent No.: US 8,549,537 B2
(45) Date of Patent: Oct. 1, 2013

(54) MIDDLEWARE BRIDGE SYSTEM AND METHOD

(75) Inventors: Lo Chuan Hu, Hsin Chu Hsien (TW); Chia Yuan Huang, Hsin Chu Hsien (TW); Ching Chun Kao, Hsin Chu Hsien (TW)

(73) Assignee: Industrial Technology Research Institute, Hsin Chu Hsien (TW)

( * ) Notice: Subject to any disclaimer, the term of this patent is extended or adjusted under 35 U.S.C. 154(b) by 1246 days.

(21) Appl. No.: 11/972,300

(22) Filed: Jan. 10, 2008

(65) Prior Publication Data

US 2009/0183172 A1 Jul. 16, 2009

(51) Int. Cl.
*G06F 13/00* (2006.01)

(52) U.S. Cl.
USPC .......................... 719/312; 719/328; 719/330

(58) Field of Classification Search
USPC .......................................... 719/312, 328, 330
See application file for complete search history.

(56) References Cited

U.S. PATENT DOCUMENTS

| | | | |
|---|---|---|---|
| 6,212,574 B1 * | 4/2001 | O'Rourke et al. | 719/321 |
| 6,871,350 B2 | 3/2005 | Wong et al. | |
| 7,194,652 B2 | 3/2007 | Zhou et al. | |
| 2003/0167270 A1 * | 9/2003 | Werme et al. | 707/10 |

OTHER PUBLICATIONS

Irfan Pyarali, Tim Harrison, Dogulas C. Schmidt, and Thomas D. Jordan, "Proactor: An Object Behavioral Pattern for Demultiplexing and Dispatching Handlers for Asynchronous Events," Sep. 1997, pp. 1-14.*

* cited by examiner

*Primary Examiner* — Andy Ho
(74) *Attorney, Agent, or Firm* — Venable LLP; Jeffri A. Kaminski

(57) ABSTRACT

This invention relates to a middleware bridge system, for bridging a kernel space module and a user space middleware having a user space interface, including: a kernel space bridge manager, for providing a kernel space interface to receive function call request from the kernel space module; an user space bridge manager, for bringing a function call relating to the function call request to the user space middleware through the user space interface, and receiving a return data from the user space middleware; wherein the architecture of the kernel space interface is the same with the architecture of the user space interface. The present invention further includes a middleware bridge method thereof.

21 Claims, 11 Drawing Sheets

| Function name | Attribute | Priority Basis | Rule |
|---|---|---|---|
| saClmClusterNodeGet | Requester = KRN_AP;<br>Regularity = YES;<br>Repetition = YES;<br>Loop_Rate = Default; | bPriority = Default; | Select_Rule = Default;<br>UsersNO_Rule = Default;<br>Tuning_Rule = Default; |
| SaAmfHealthcheckCallbackT | Requester = HAMW;<br>Regularity = YES;<br>Repetition = YES;<br>Loop_Rate = Default; | bPriority = Default; | Select_Rule = Default;<br>UsersNO_Rule = Default;<br>Tuning_Rule = Default; |
| saAmfCompNameGet | Requester = KRN_AP;<br>Regularity = YES;<br>Repetition = NO;<br>Grouping = YES;<br>Group = Default; | bPriority = Default;<br>gPriority = Default; | Select_Rule = Default;<br>UsersNO_Rule = Default;<br>Tuning_Rule = Default; |
| ...... | ...... | ...... | ...... |

FIG. 7

United States Patent US 8,549,537 B2

MIDDLEWARE BRIDGE SYSTEM AND METHOD

FIELD OF THE INVENTION

The present invention relates to a middleware bridge system and method, and more particularly to a middleware bridge system for supporting a usage of a user space middleware from a kernel space module.

BACKGROUND OF THE INVENTION

Middleware is a kind of supporting software for use in Linux-like operating system, which is used to support development of application systems.

However, the middleware generally be used in user space. Fore example, High Availability (HA) middleware is used in user space to support a high available function with Linux-like operating system, which provides a high speed, stable and continuous network communication. Wherein, the HA middleware is formed as AIS (Application Interface Specification) standard established by Service Availability Forum (SA Forum).

Some kernel space modules, such as Layer 2 HA (High Available) network communication modules, can not use the HA middleware directly. The function call request from the kernel space modules has to be transformed as a user space supportable command, and then sent to the HA middleware. Hence, the communication between the kernel space modules and the HA middleware is not convenient and complex.

The kernel space modules must be developed for each specific module and middleware with specific bridging system, which is inconvenient and waste lots cost to develop specific bridging system for each kernel space module and middleware.

SUMMARY OF THE INVENTION

The present invention relates to a middleware bridge system and method, which is used to bridge the kernel space modules and user space middleware and further to extend the support of a user space middleware to a kernel space module.

According to the above object, the present invention provides a middleware bridge system, for bridging a kernel space module and a user space middleware having a user space interface, comprising: a kernel space bridge manager, for providing a kernel space interface to receive function call request from the kernel space module; an user space bridge manager, for bringing a function call relating to the function call request to the user space middleware through the user space interface, and receiving a return data from the user space middleware; wherein the architecture of the kernel space interface is the same with the architecture of the user space interface.

According to the above object, the present invention also provides a middleware bridge method, for bridging a kernel space module and a user space middleware having a user space interface, comprising the steps of: simulating the user space interface as a kernel space interface in kernel space; receiving a function call request from the kernel space module through the kernel space interface; bringing a function call relating to the function call request to the user space middleware through the user space interface; receiving a return data from the user space middleware through the user space interface; and transmitting the return data to the kernel space module through the kernel space interface.

The present invention provides an environment for program developer to use the middleware well in kernel space modules, and provides a general solution for multi kernel space modules.

BRIEF DESCRIPTION OF THE DRAWINGS

The objective, spirits and advantages of the present invention will be readily understood by following detailed description with accompanying, wherein:

FIG. 7 is a diagram which shows one embodiment of the rule table.

DETAILED DESCRIPTION OF THE EMBODIMENTS

The present invention is provided to expand the functions of middleware in user space to be used in the kernel space module under Linux-like operation system. The present invention includes a middleware bridge system to bridge the kernel space modules and user space middleware, therefore to extend the support of a user space middleware to a kernel space module.

In one embodiment of the present invention, the middleware bridge system is used to be a proxy of a HA (High Availability) middleware, wherein the HA middleware provides relative functions or services through an API (Application Interface), which conforms the AIS (Application Interface Specification) standard established by SA Forum. However, the standard of the HA middleware is not the constraint of the implementation of the present invention.

Figure 1:
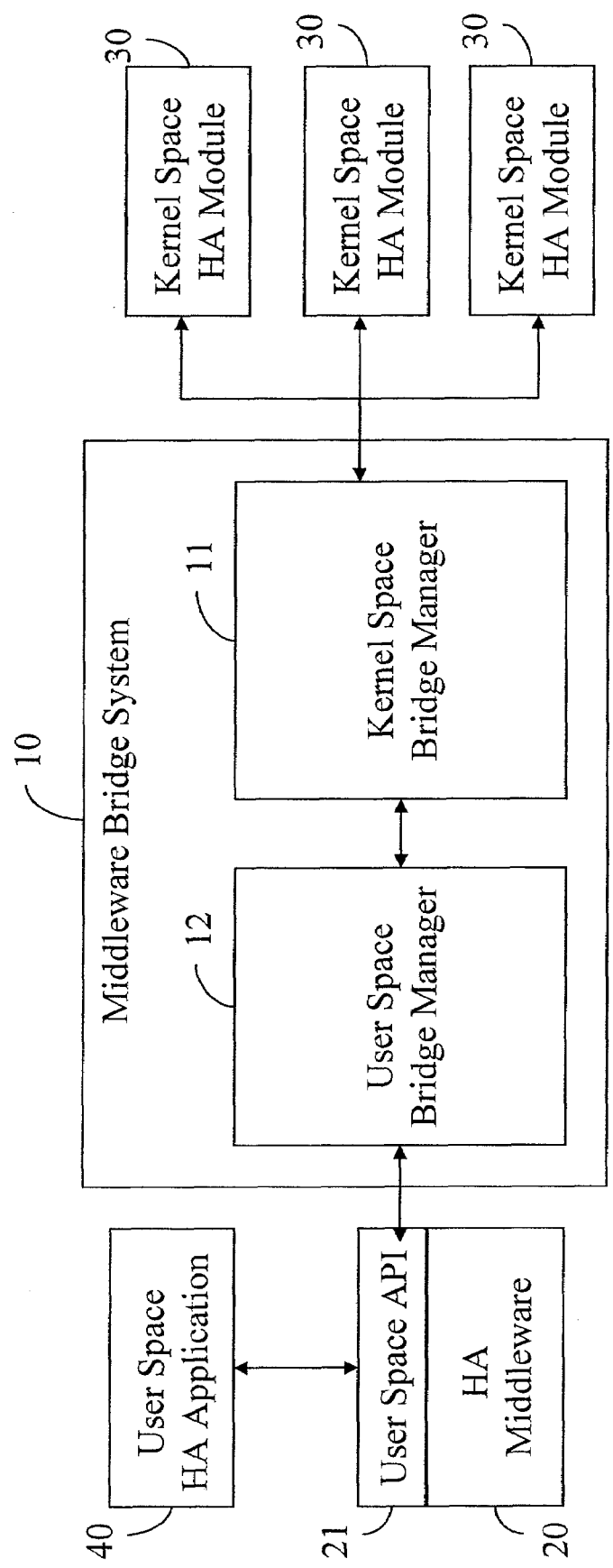
FIG. 1 is a diagram of the system architecture of a middleware bridge system in accordance with one embodiment of the present invention.

Referring to FIG. 1, it shows the system architecture of a middleware bridge system 10 in one embodiment of the present invention. The middleware bridge system 10 is used to bridge a user space HA (High Availability) middleware 20 for use in kernel space. The middleware bridge system 10 includes a kernel space bridge manager 11 to receive function call requests from a plurality of kernel space HA modules 30, and a user space bridge manager 12 to invoke function calls relating to the function call requests to a HA middleware 20 through an user space API 21 to execute corresponding functions in the user space.

After the HA middleware 20 executing the corresponding functions, the user space bridge manager 12 receives a return data of the execution from the HA middleware 20 to the kernel space bridge manager 11, and thereafter the kernel space bridge manager 11 transmits the return data to the kernel space HA module 30.

Figure 2:
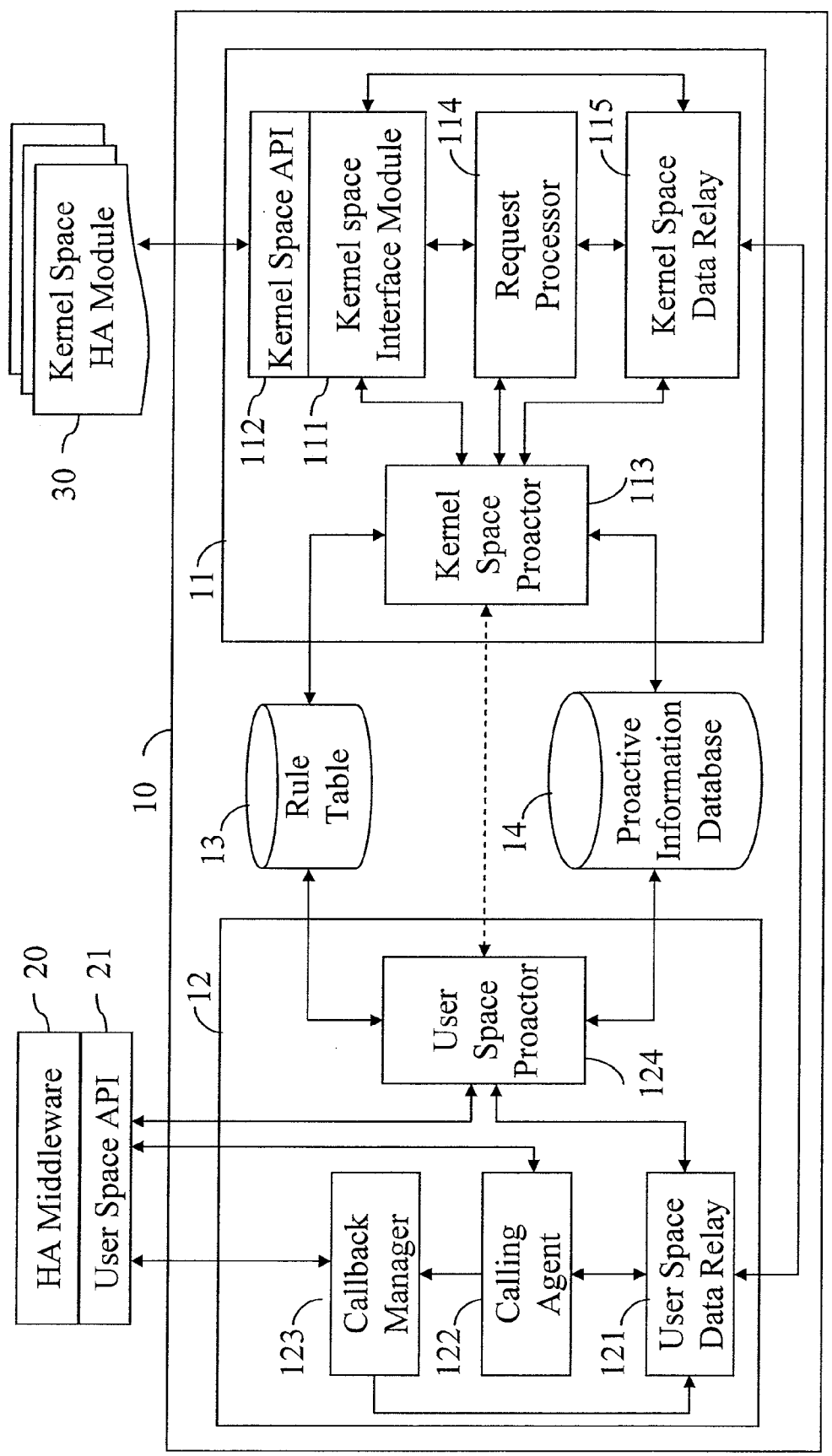
FIG. 2 is a diagram of the function blocks of the middleware bridge system in one embodiment of the present invention.

Referring to FIG. 2, it shows function blocks of the middleware bridge system 10 in one embodiment of the present invention. The kernel space bridge manager 11 is responsible for transmitting the function call requests from the kernel space HA module 30 to the user space bridge manager 12 and transmitting the return data to the kernel space HA module 30, which includes a kernel space interface module 111 with a kernel space API 112, a kernel space proactor 113, a request processor 114 and a kernel space data relay 115.

The kernel space interface module 111 receives the function call request from the kernel space module 30, and includes the kernel space API 112 acted as a virtual interface to simulate the user space API 21 for the kernel space HA module 30, therefore to provide same functions with the user space API 21 to the kernel space HA module 30. The kernel space interface module 111 includes virtual functions corresponding to the supported HA middleware 20, and each virtual function will interpret each variable, such as direct value or the pointer indicating to an indirect value, in the received function call request by the standard of the kernel space API 112. Wherein, the architecture of the kernel space API 112 is the same with the architecture of the user space API 21. Thereafter, the virtual functions grab necessary data relating to the function call request and then send to the kernel space proactor 115 or the request processor 114 when the kernel space proactor 115 is not existed. As a result, while the return data is obtained, the kernel space interface module 111 transmits the return data to the kernel space HA module 30 through the kernel space API 112.

The kernel space proactor 113 is used to handle the function call request if the return data of the function call request is already existed, or send the function call request to the request processor 114 if the function call request needs to be processed in the HA middleware 20. The request processor 114 is used to gather function call requests from a plurality of kernel space HA module 30 as a calling data in a calling queue, and transmit the calling data in the way of aggregation or cache. Further, the request processor 114 transmits the received return data to the kernel space interface module 111. The kernel space data relay 115 is responsible for the communication of the middleware bridge system 10 in kernel space, such as transmitting the calling data or receiving the return data.

The user space bridge manager 12 is used to manage and handle the calling data, propose function calls to the HA middleware 20, and transmit the return data back to the kernel space bridge manager 11. Wherein, the user space bridge manager 12 includes an user space data relay 121, a calling agent 122, a callback manage 123 and an user space proactor 124.

The user space data relay 121 is responsible for the communication of the middle bridge system 10 in user space, such as receiving the calling data or transmitting the return data. The calling agent 122 is used to analyze and recognize the calling data, proceed the function call in the calling data as a user end to the HA middleware 20, and receive the return data from the HA middleware 20. The callback manager 123 is responsible for the callback functions, which includes a virtual callback proxy registered with a virtual callback function. While a callback function call is invoked from the HA middleware 20, the virtual callback proxy calls the kernel space data relay 115 to look for the corresponding real kernel space HA module 30 having the callback function for execution. The user space proactor 124 is used to process a function pre-call in advance, and transmit the return data to the kernel space bridge manager 11.

The middleware bridge system 10 further includes a proactive mechanism with proactive process of some function calls which are executed to obtain or refer data constantly, so as to improve the efficiency of the middleware bridge system 10 and reduce the communication between the kernel space bridge manager 11 and the user space bridge manager 12. The proactive mechanism is comprised with the kernel space proactor 113, the user space proactor 124, a rule table 13 and a proactive information database 14. In which, the rule table 13 and the proactive information database 14 both have two parts in user space and kernel space respectively.

The proactive mechanism operates based on the pre-defined rule table 13. The proactive mechanism is used to invoke function call in advance or actively before the kernel space HA module 30 sending the function call request, and to store the return data of the executing result as proactive information in the proactive information database 14. So that, the kernel space proactor 113 can answer the function call request from the kernel space HA module 30 immediately without the help of the user space bridge manager 12 and HA middleware 20 while the kernel space HA module 30 send out the function call request.

The kernel space proactor 113 first sees if the function call request have a corresponding proactive information in the proactive information database 14 when receives the function call request from the kernel space HA module 30, and then to determine, according to the rule table 13, whether to return the proactive information or continuously transmit and bridge the function call request to the user space bridge manager 12. Wherein, the function call requests suitable for proactive processing normally relates to functions of Get/Read type with system data, and the data must be abiding, reserved, stable or constantly. When the function call requests are repeated, the kernel space proactor 113 can make a circular call automatically to make sure of obtaining the newest data. Therefore, the proactive processing can provide an accurate result efficiently.

Hence, in the procedure of the kernel space bridge manager 11, the kernel space interface module 111 is first to receive the function call request from the kernel space HA module 30, and then the kernel space proactor 113 checks if the proactive information relating to the function call request has been stored in the proactive information database 14 already. If the proactive information is existed and valid, then the kernel space proactor 113 transmit the proactive information as a return data to the kernel space HA module 30, otherwise the kernel space proactor 113 transmits the function call request to the request processor 114. The request processor 114 packages the function call request as a calling data and passes the calling data to the kernel space data relay 115. Therefore, the kernel space data relay 115 can transmit the calling data to the user space bridge manager 12.

In the follow-up procedure, the user space data relay 121 is used to receive the calling data from the kernel space data relay 115, and transmits the calling data to the calling agent 122 for the calling agent 122 to check the function call request in the calling data. If the function call request relates to a callback registering function, the calling agent 122 transmits the function call request to the callback manager 123, otherwise the calling agent 122 brings a function call of the function call request to the HA middleware 20 through the user space API 21. After brought the function call to the HA middleware 20, the calling agent 122 can receive a return data from the HA middleware, and transmit the return data to the kernel space bridge manager 11 via the user space data relay 121. And then, the kernel space bridge manager 11 can transmit the received return data to the kernel space HA module 30.

If the callback manager 123 receives a function call request relating to a callback registering function, the callback manager 123 can register a virtual callback function relating to the function call request to the HA middleware 20 by the virtual callback proxy. The virtual callback proxy is responsible for finding the target kernel space HA module 30 and transmits a callback function call invoked from the HA middleware 20 to the target kernel space HA module 30. Consequently, the target kernel space HA module 30 can execute a callback function relating to the callback function call, and transmit a return data to the callback manager 123 and then to the HA middleware 20.

Figure 3:
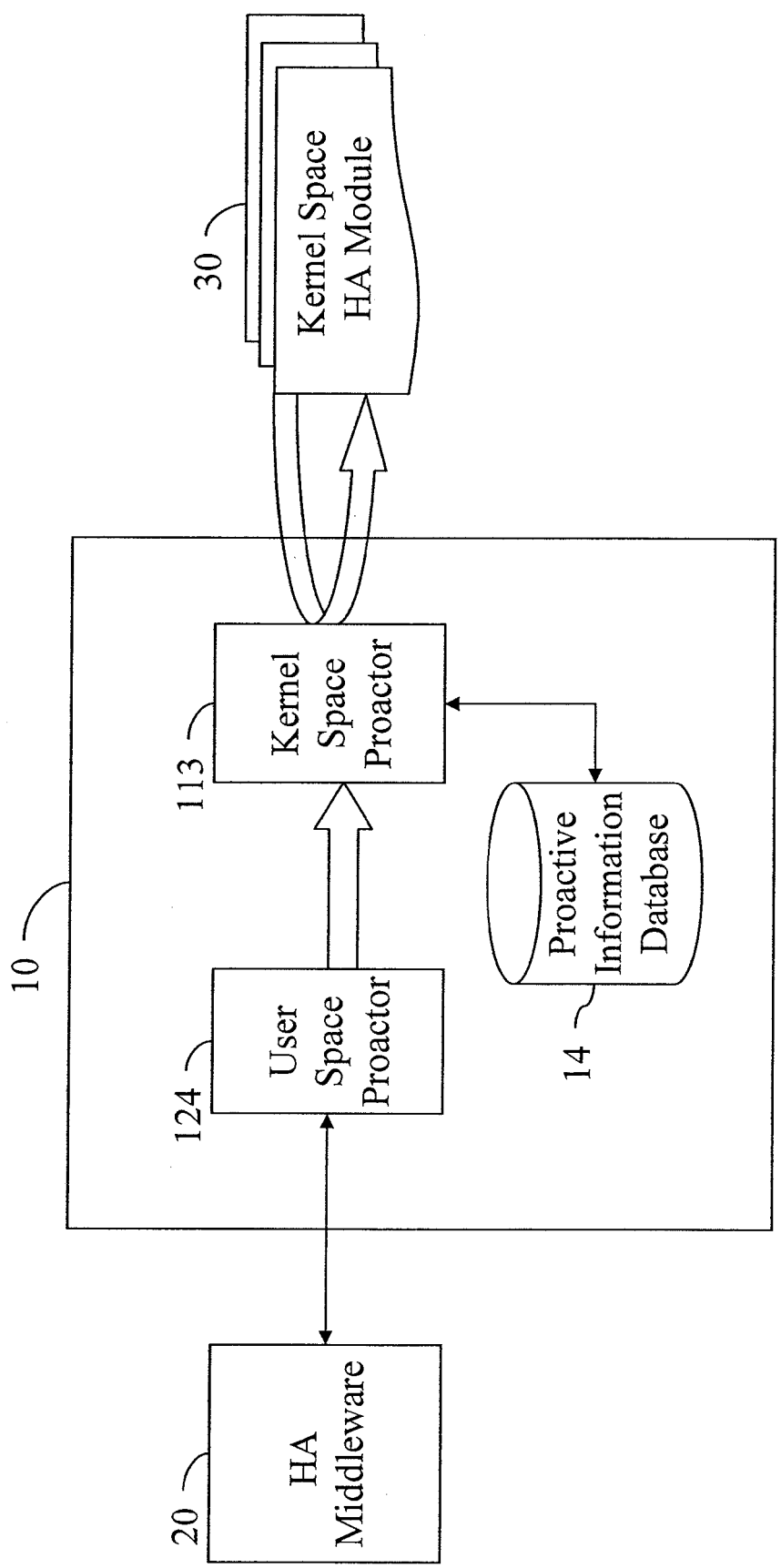
FIG. 3 is a diagram which shows one embodiment of the middleware bridge system.

The proactive mechanism of the middleware bridge system 10 has two embodiments as a kernel-AP requester or a HA-middleware requester to deal with the function call requests from the kernel space HA module 30 and the HA middleware 20 respectively. Referring to FIG. 3, it shows the system architecture of the kernel-AP requester, wherein the user space proactor 124 will do a pre-call or an active circular call to obtain proactive information including the return data to the kernel space proactor 113. Furthermore, the user space proactor 124 can operate with the method of cache to compare whether a difference between the presently obtained data and the former obtained data. If there has no difference between the presently obtained data and the former obtained data, then the user space proactor 124 need not to transmit the presently obtained data to the kernel space proactor 113. The kernel space proactor 113 will check the proactive information database 14 firstly while receiving a function call request from the kernel space HA module 30. If the return data is stored in the proactive information database 14, the kernel space proactor 113 can answer the function call request by transmit the stored return data without asking any information from the user space proactor 124. Hence, the transmitting times between the user space proactor 124 and the kernel space proactor 113 can be reduced, and the responding time can be accelerated.

Figure 4:
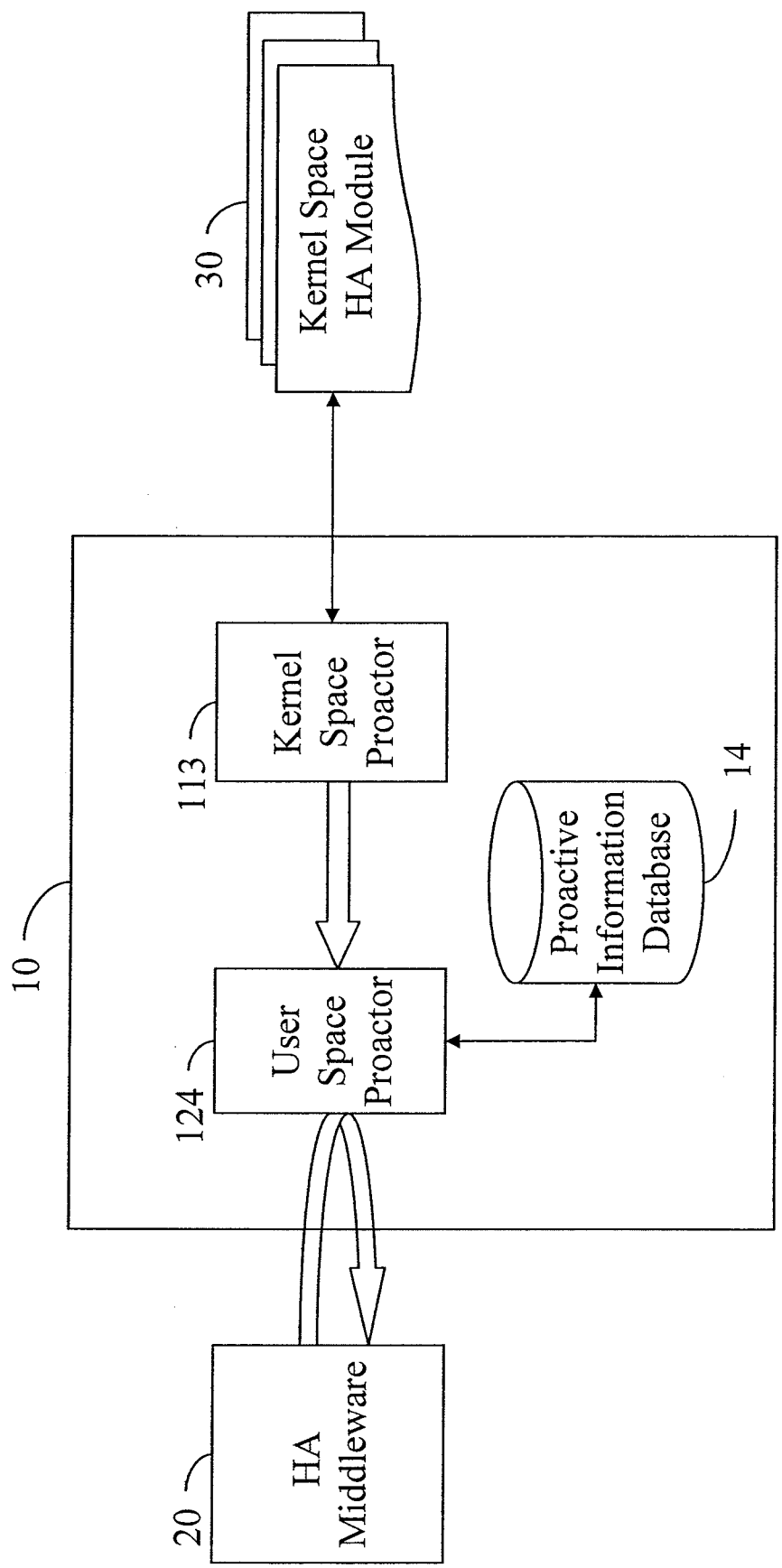
FIG. 4 is a diagram which shows one embodiment of the middleware bridge system.

Mostly, the function call requests are started from the kernel space HA modules 30. However, the HA middleware 20 sometimes needs to bring up function call requests to the kernel space HA modules 30, for example callback functions, to ask states of the kernel space HA modules 30. Referring to FIG. 4, it shows the system architecture of the HA-middleware requester, wherein the kernel space proactor 113 will do a pre-call or an active circular call to obtain proactive information including the return data from the kernel space HA module 30 to the user space proactor 124. Furthermore, the kernel space proactor 113 can use the method of cache to improve the efficiency of the proactive mechanism.

Figure 5:
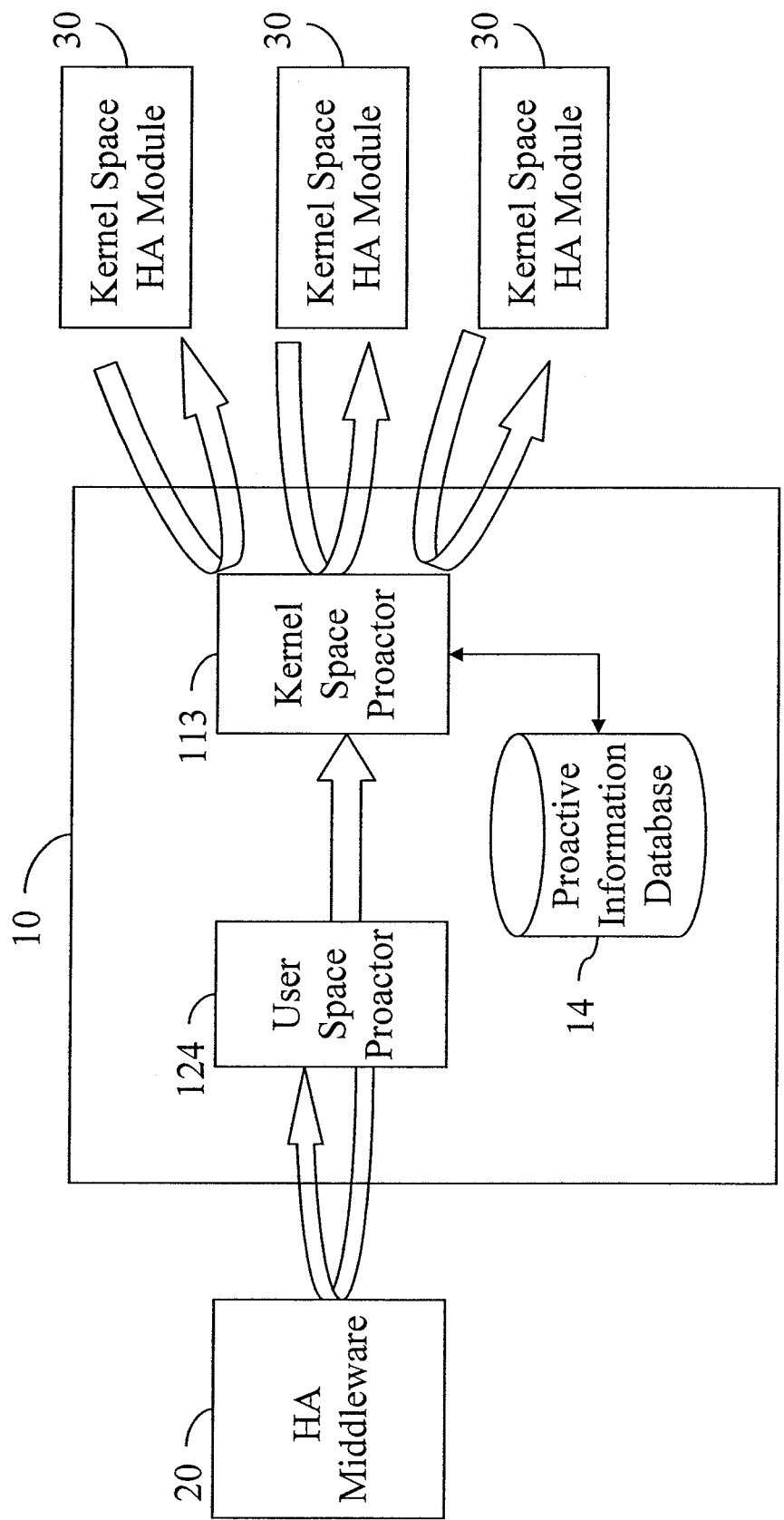
FIG. 5 is a diagram which shows one embodiment of the middleware bridge system.

Moreover, the proactive mechanism can be arranged for services in specific HA middleware, such as Availability Service, Cluster Membership Service (CLM). Especially, some functions are used to check states or data of the HA middleware 20, such as Get HA State and Get Component Readiness State in the Availability Service, or Get Membership in the CLM Service. For example, the information of all cluster members are used to describe the state of the cluster in each node, therefore, all return data should be the same when a plurality of kernel space HA modules 30 are constantly checking the information of all cluster members in the function of Get Membership. So that, the kernel space proactor 113 can play as a proxy to share the same information to all kernel space HA modules 30 as shown in FIG. 5.

Figure 6:
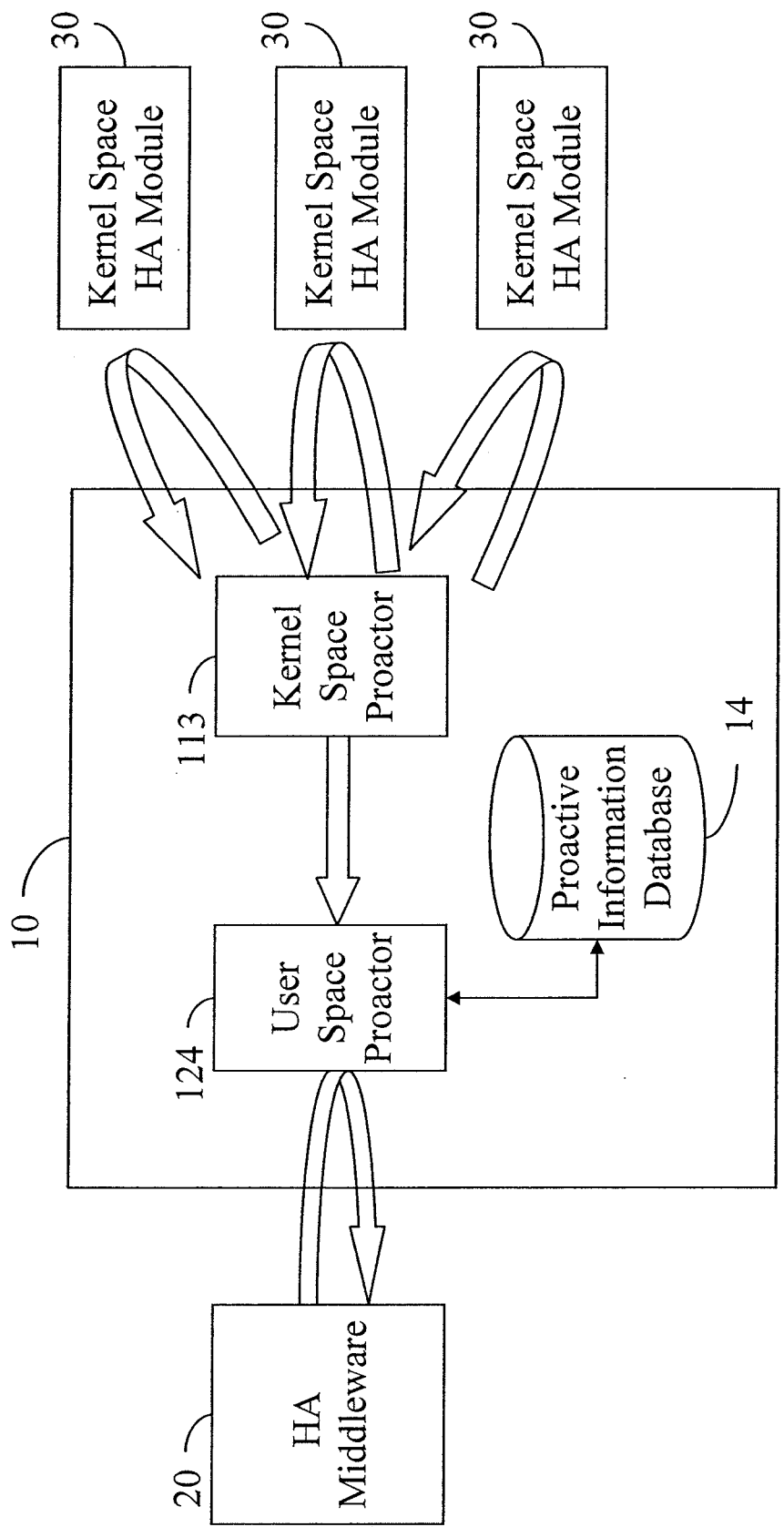
FIG. 6 is a diagram which shows one embodiment of the middleware bridge system.

In some cases, the HA-middleware requester of the proactive mechanism can be used to handle the Get/Read function calls from the HA middleware 20 in way of callback function, such that the HA middleware 20 may do a Health Check to each kernel space HA module 30 constantly to be the basis of failover. Referring to FIG. 6, the HA middleware 20 are proceeding the Health Check to each kernel space HA module 30, and the kernel space proactor 113 may not transmit a return data to the user space proactor 124 if the kernel space HA modules 30 are holding in well default state. The user space proactor 124 can transmit the proactive Health Check information stored in the proactive information database 14 directly to answer the function call request from the HA middleware 20. In advance, the user space proactor 124 can cover the kernel space HA modules 30 for replying the callback functions with acknowledge message.

The middleware bridge system 10 of the present invention further provides a rule-based management method to manage the decision of the proactive mechanism by selected rules, in which the rules are determined by system resources, such as spare space of a memory, occupied processing time, iteration, CPU loading and etc - - - . In order to manage the decision by those rules, the middleware bridge system 10 has to monitor the system resources at all times to determine which rule for enforcement. So that, the middleware bridge system 10 can choose the proper way to manage and balance the system resources.

The proactive mechanism is operated based on the pre-defined rule table 13. Referring to FIG. 7, it shows some function characteristics of the Get/Read function, including the fields of Function Name, Attribute, Priority Basis and Rule. The Attribute field is used to express the feature of the function, further to determine whether the function is suitable for proactive processing. Within the attribute field, a Requester variable is used to identify the initiator of the function call, such as KRN-AP or HAMW on behalf of the proaction type of Kernel-AP Requester or HA-middleware Requester respectively. A Regularity variable is used to show the stability and invariability of the function call, wherein the function is suitable for proactive processing only when the Regularity variable is labeled as YES. A Repetition variable is used to identify the repeatable feature of the function call, wherein the function call is suitable for proactive processing when the Repetition variable is labeled as YES. A Loop_Rate is used to set the executing frequency of the repeatable function call. Grouping/Group variables are used to set the group of non-repeatable functions for community processing, so that the group of non-repeatable functions can be processed in proactive processing. Furthermore, a Sequence variable can be used to express a sequence of a series of function calls to active the proactive mechanism for proactive execution of the function in next sequence actively.

The Priority Basis field is the major factor to determine the priority level of the function, represents to the importance of the function and the expected benefit of the proactive execution of the function, so that the proactive mechanism can select the functions with higher priority for proactive execution when the system resources are insufficient. The Priority Basis field can be set as High, Medium, Low or Default, and the proactive mechanism can set the Priority Basis of the function automatically in accordance with Repetition and Loop_Rate variables while the Priority Basis field is set as Default. If the Repetition variable is labeled as YES and the Loop_Rate is labeled as CONT indicating the continuity of the function request, then the Priority Basis of the function will be set as High, otherwise the Priority Basis of the function will be set as Medium. However, when the Repetition variable is labeled as NO, then the Priority Basis of the function will be set as Low.

The Rule field is used to identify the operation and management rules to the proactive mechanism. Based on the system resources, the proactive mechanism will follow the Select_Rule variable to determine and select the priority of the function calls for proactive execution, and follow the UsersNO_Rule variable to determine numbers of function calls, namely the retained scalability for the kernel space HA modules 30 in the embodiment, for proactive execution while initialization.

The Select_Rule variable can be set as SYS_MEM, NONE or Default, wherein SYS_MEM represents that the proactive mechanism can control the Priority Basis according to the available memory space of the system memory, NONE represents that the proactive mechanism has not to control the Priority Basis, and Default equals to SYS_MEM. The UsersNO_Rule variable can be set as SYS_MEM, NONE or Default as well, wherein SYS_MEM represents the proactive mechanism can control the scalability according to the present available memory space of the system memory, NONE represents that the proactive mechanism has not to control the scalability with largest scalability, and Default equals to SYS_MEM. Whatever, the proactive mechanism has to check the system resources and follows the Select_Rule and UsersNO_Rule variables during the operation.

Also, the proactive mechanism will keep watching the using status of the functions, and follow a Tuning_Rule variable to adjust the management of Enable/Disable in proactive schedule to each function for adding or removing functions in proactive schedule. The Tuning_Rule variable can be set as USE_TIMES or EFFICIENCY, in which USE_TIMES represents that the proactive mechanism adjusts by the using times of each function in duration, and EFFICIENCY represents that the proactive mechanism adjusts by the efficiency of proactive execution of each function.

Figure 8:
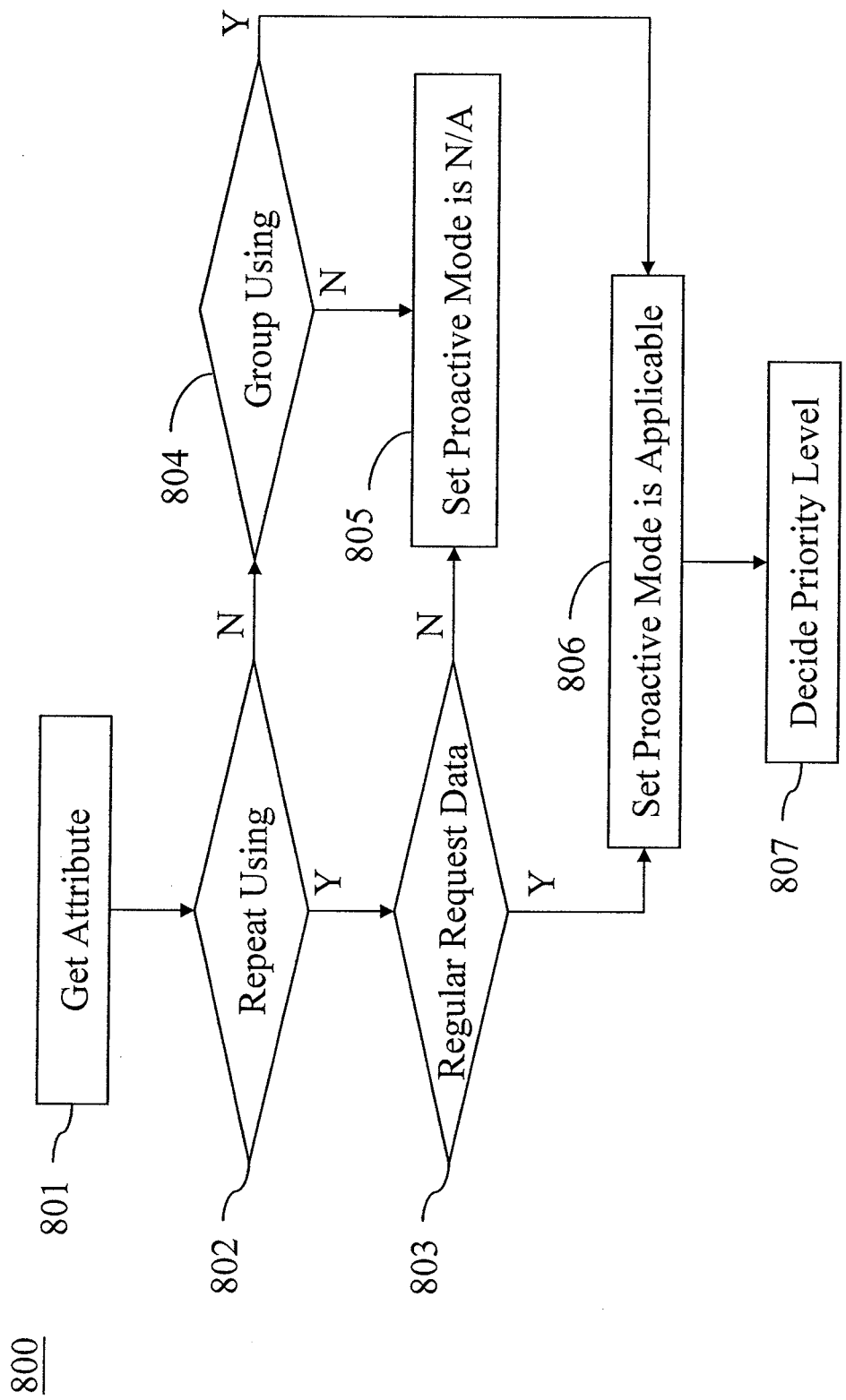
FIG. 8 is a diagram which shows the flow of the proactive mechanism to identify which function is suitable for proactive execution.

Referring to FIG. 8, it shows a flow chart 800 of the proactive mechanism to identify which function is suitable for proactive execution. In step 801, the proactive mechanism is first to obtain the attributes of selected function of Get/Read type from the Attribute field in rule table 13; in step 8002, the selected function is checked with the Repetition variable, if the Repetition variable is labeled as YES then the flow goes to step 803 otherwise it goes to step 804; in step 803, the selected function is checked with the Regularity variable, if the Regularity variable is labeled as YES then the flow goes to step 806 otherwise it goes to step 805; in step 804, the selected function is checked with the Grouping variable, if the Grouping variable is labeled as YES then the flow goes to step 806 otherwise it goes to step 805; in step 805, a proactive mode of the selected function will be set as N/A to represent that the selected function can not be put into proactive execution; in step 806, the proactive mode of the selected function will be set as Applicable; and in step 807, the proactive mechanism decides the Priority Basis of the selected function according to the system resource usage rate of the selected function, such as processing time.

Figure 9:
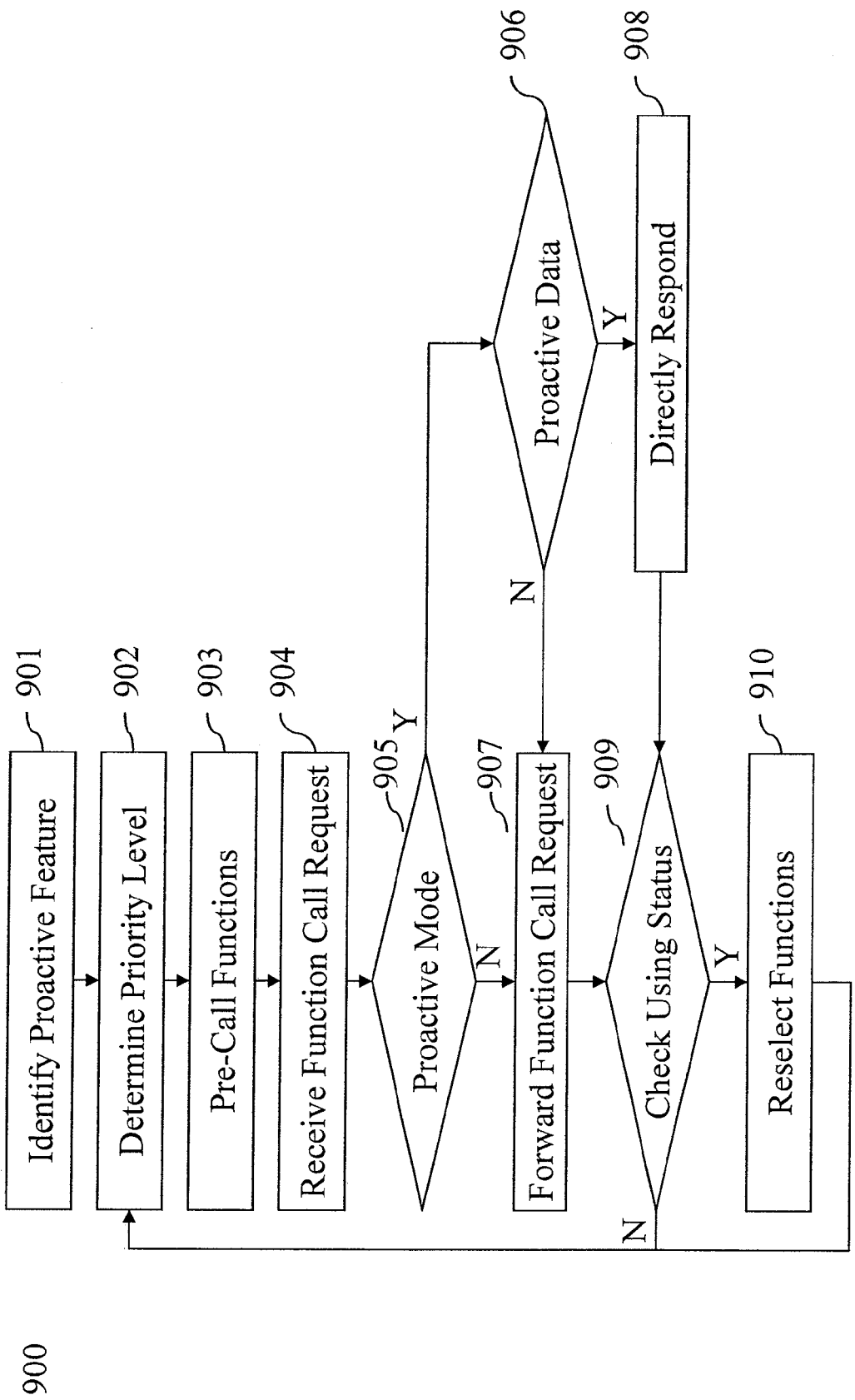
FIG. 9 is a diagram which shows the flow of the proactive execution.

Referring to FIG. 9, it shows a flow chart 900 of the proactive mechanism to show the flow of the proactive execution. In step 901, the proactive mechanism is first to identify the proactive mode and Priority Basis of each of all the selected functions; in step 902, the proactive mechanism will determine and select the priority level for proactive execution and pre-call of the function by the Select_Rule variable of rule table 13 and the system resource usage, such as memory space; in step 903, the proactive mechanism pre-calls the selected functions and stores the return data; in step 904, a function call of the selected function from an client side, such as kernel space HA module 30, is received; in step 905, the function call is checked with its proactive mode, if the proactive mode is applicable then the flow does to step 906, otherwise it goes to step 907; in step 906, the function call is checked with its effective return data, if the effective return data is obtained then the flow does to step 908, otherwise it goes to step 909; in step 907, the function call is forwarded to a server side, such as the HA middleware 20, and the proactive mechanism is used to obtain the effective return data; in step 909, the proactive mechanism goes to keep watching and recording the usage condition of the proactive execution of the selected function; and in step 910, the proactive mechanism can go to reselect the next function to be handles with proactive execution.

Figure 10:
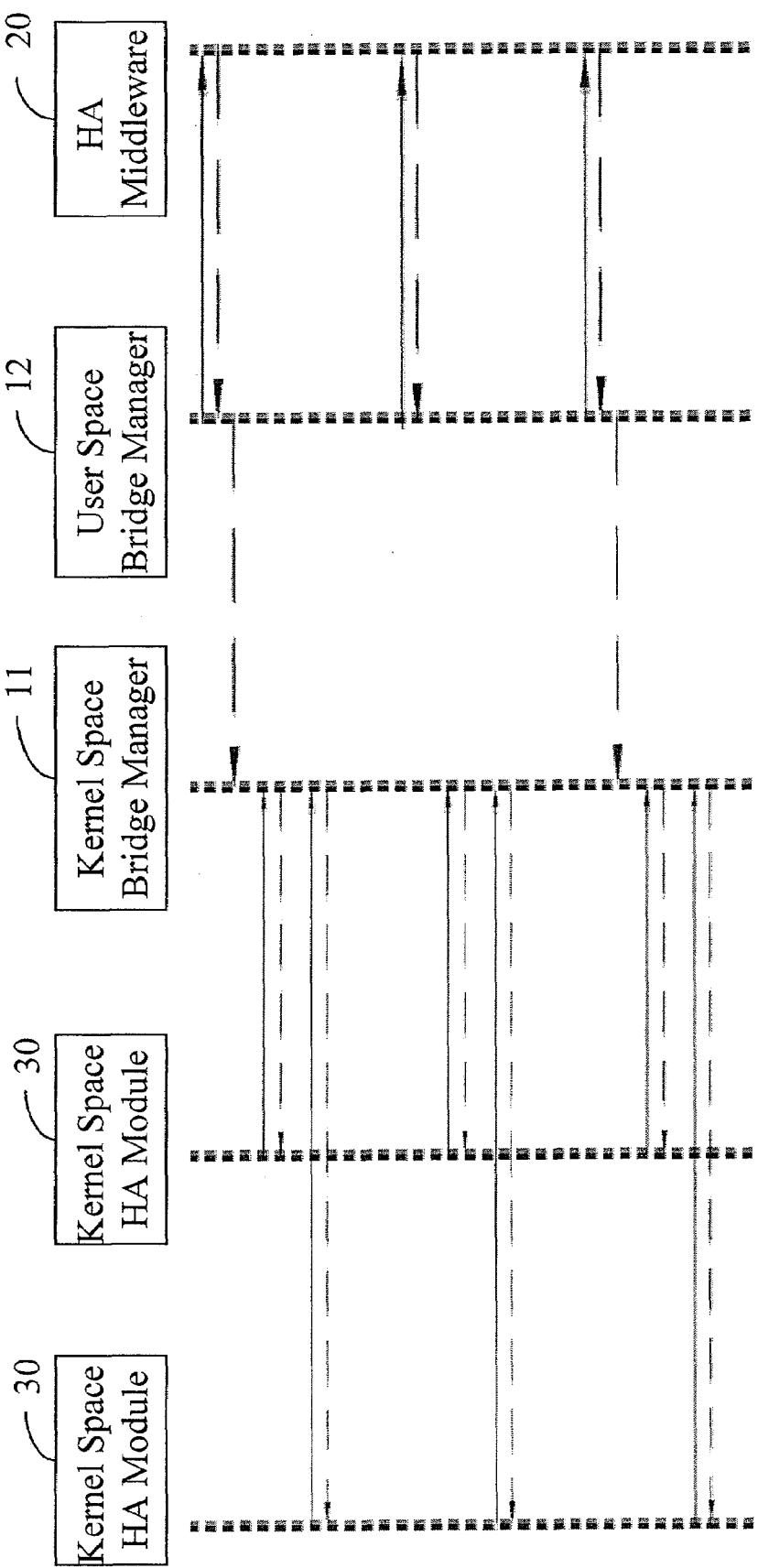
FIG. 10 is a diagram which shows the communication between the kernel space bridge manager and the user space bridge manager.

Referring to FIG. 10, the present invention can reduce the communication between the kernel space bridge manager 11 and the user space bridge manager 12 while the proactive mechanism is applied. The user space bridge manager 12 detects the change of the return data from the HA middleware 20, and transmits the return data to the kernel space bridge manager only if the return data is changed or system is during initialization. Therefore, the communicating frequency of the kernel space bridge manager 11 and the user space bridge manager 12 can be reduced, and the kernel space bridge manager 11 can answer the function call request from kernel space HA modules 30 directly.

Figure 11:
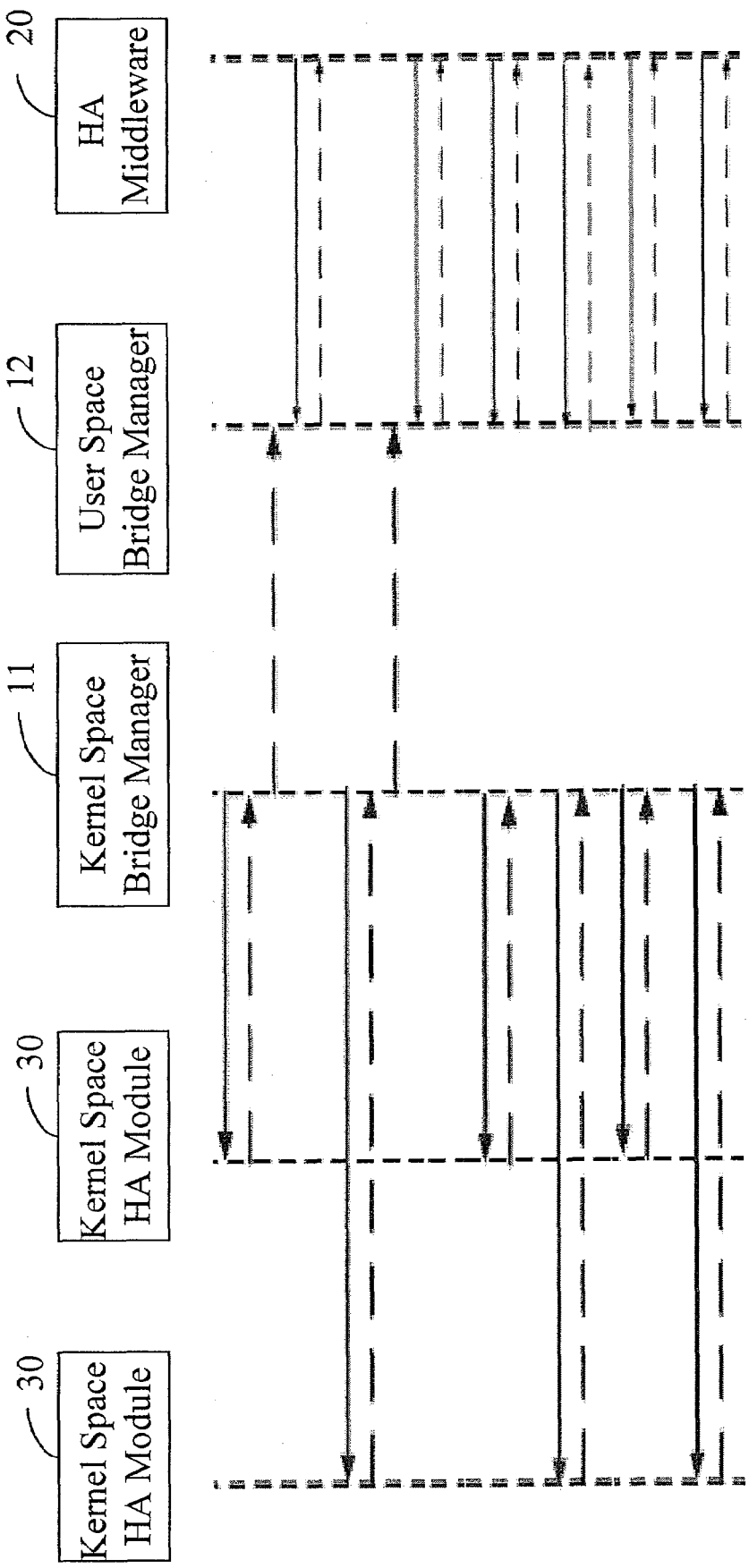
FIG. 11 is another diagram which shows the communication between the kernel space bridge manager and the user space bridge manager.

Referring to FIG. 11, the present invention can reduce the communication between the kernel space bridge manager 11 and the user space bridge manager 12 in the Health Check function of Availability Service applying the proactive mechanism. When the HA middleware 20 requests a callback function, Health Check function, the user space bridge manager 12 can get the obtained data in advance from the kernel space bridge manager 11 immediately. Furthermore, the kernel space bridge manager 11 detects the change of the return data from the kernel space HA modules 30, and transmits the return data to the user space bridge manager only if the return data is changed or system is during initialization. Therefore, the communicating frequency of the kernel space bridge manager 11 and the user space bridge manager 12 can be reduced, and the user space bridge manager 12 can answer the function call request from HA middleware 20 directly.

The present invention provides an environment for program developer to use the middleware well in kernel space modules, and provides a general solution for multi kernel space modules.

With a detailed description of the various embodiments of this invention, those skilled in the art will readily appreciate that various modifications and changes can be applied to the embodiments of the invention as hereinbefore described without departing from its scope, defined in and by the appended claims. In addition, the embodiments should be construed as a limitation on the actual applicable description of the invention.

What is claimed is:

1. A middleware bridge system, in a computer system having at least one processor, for bridging a kernel space module and a user space middleware having a user space interface, comprising:
   a kernel space bridge manager, for providing a kernel space interface to receive a function call request from the kernel space module, and relaying the function call request to a user space bridge manager;

an user space bridge manager, for invoking the function call relating to the function call request to the user space middleware through the user space interface, getting a return data from the user space middleware, and relaying the return data to the kernel space bridge manager;

wherein the kernel space bridge manager offers the return data to the kernel space module through the kernel space interface;

wherein the architecture of the kernel space interface is the same with the architecture of the user space interface;

wherein the user space bridge manager comprises a user space proactor to pre-call the user space middleware a pre-defined function call in advance or actively then receive the return data from the user space middleware, and transmit the received return data to the kernel space bridge manager;

wherein the proactor includes the user space proactor and a kernel space proactor placed in the user space bridge manager and the kernel space bridge manager respectively.

2. The middleware bridge system as claimed in claim 1, wherein the user space proactor actively pre-calls the user space middleware with pre-defined function calls in advance, then receives the return data from the user space middleware and transmits the return data to the kernel space proactor in kernel space bridge manager in advance, if the value of the return data is new, before the kernel space application module submits the request.

3. The middleware bridge system as claimed in claim 1, further comprising a rule table stored in the storage to indicate specifically how the proactor performs and manages the proactive action and the pre-call of the proactive function calls for each pre-defined function call.

4. The middleware bridge system as claimed in claim 3, the proactor monitors system resources at all times and manages the process of the proactor according a rule defined in a rule table for each pre-defined function call, wherein the system resources includes spare space of a memory, occupied processing time, and CPU loading.

5. The middleware bridge system as claimed in claim 3, the proactor determine what action to perform according to an attribute of a function defined in a rule table for each pre-defined function call.

6. The middleware bridge system as claimed in claim 1, wherein the pre-defined API function call relates to functions to get or read system data with features of abiding and reserved, comprising the types of:
repetition function, for indicating the function call to be pre-called by proactor repeatedly and continuously;
grouping function, for indicating a set of function calls to be pre-called concurrently;
sequence function, for indicating a series of function calls to pre-called in sequence.

7. The middleware bridge system as claimed in claim 1, wherein the kernel space proactor to receive the return data for a pre-calling a function from the user space proactor in user space bridge manager and stores the return data as proactive information before the kernel space application module invokes the function call.

8. The middleware bridge system as claimed in claim 7, further comprising a proactive information database stored in the storage to store the proactive information always containing the newest return data of the proactive function calls without a requester's invocation.

9. The middleware bridge system as claimed in claim 7, wherein the kernel space proactor transmits proactive information having a return data, relating to a request of a function call pre-called by user space proactor, to the kernel space module immediately while receives the function call request from the kernel space module without relaying the function call request to user space bridge manager and without waiting the return data forever.

10. The middleware bridge system as claimed in claim 1, wherein the user space bridge manager comprises a call back manager stored in the storage for including a virtual call back proxy to register a substitutive virtual callback function in user space representing a real callback function to kernel space with the user space middleware while receives a function request relating to registering function of a callback function from the kernel space module.

11. The middleware bridge system as claimed in claim 10, wherein the virtual callback function contained in virtual callback proxy, during receiving a callback function execution request from the user space middleware, notices the kernel space bridge manager to look for a real callback function in kernel space and execute the callback function.

12. A middleware bridge method, in a computer system having at least one processor, for bridging a kernel space module and a user space middleware having a user space interface, the method comprising the steps of:
simulating the user space interface as a kernel space interface in kernel space by a kernel space bridge manager;
receiving a function call request from the kernel space module through the kernel space interface by the kernel space bridge manager;
relaying the function call request to a user space bridge manager by the kernel space bridge manager;
invoking the function call relating to the function call request to the user space middleware through the user space interface by the user space bridge manager;
getting a return data from the user space middleware through the user space interface by the user space bridge manager;
relaying the return data to the kernel space bridge manager by the user space bridge manager;
offering the return data to the kernel space module through the kernel space interface by the kernel space bridge manager; and
pre-calling a pre-defined function call in advance or actively then receiving the return data from the user space middleware, and transmitting the received return data to the kernel space module;
wherein the proactive process is associated with a user space proactor and a kernel space proactor.

13. The middleware bridge method as method in claim 12, further comprising the step of actively pre-calling the user space middleware with pre-defined function calls in advance, then receiving the return data to the kernel space proactor in the kernel space bridge manager in advance, if a value of the return data is new, before the kernel space application module submits the request.

14. The middleware bridge method as method in claim 12, further comprising the step of indicating specifically how the proactor performs and manages the proactive action and pre-call of the proactive function calls for each pre-defined function call.

15. The middleware bridge method as claimed in claim 14, further comprising monitoring with the proactor system resources at all times and managing the process of the proactor according to a rule defined in a rule table for each pre-defined function call, wherein the system resources includes spare space of memory, occupied processing time, and CPU loading.

16. The middleware bridge method as claimed in claim 15, further comprising the step of determining what action to perform according to an attribute of a function defined in the rule table for each predefined function call.

17. The middleware bridge method as claimed in claim 12, wherein the pre-defined function call relates to functions to get to read system data with features of abiding and reserved, comprising the types of:
 repetition function, for indicating the function call to be pre-called by proactor repeatedly and continuously;
 grouping functions, for indicating a set of function calls to pre-called concurrently;
 sequence function, for indicating a series of function calls to be pre-called in sequence.

18. The middleware bridge method as method in claim 12, further comprising the step of receiving the return data for a pre-calling of a function call from the user before the kernel space application module invokes the function call. space proactor in user space bridge manager and storing the return data as proactive information

19. The middleware bridge method as method in claim 18, further comprising the step of transmitting the proactive information having a return data, relating to a request of a function call pre-called by user space proactor, to the kernel space module immediately while receives the function call request from the kernel space module without relaying the function call request to user space bridge manager and without waiting the return data forever.

20. The middleware bridge method as method in claim 12, further comprising the step of registering a substitutive virtual callback function in user space representing a real callback function in kernel space with the user space middleware while receives a function request relating to registering function of the callback function from the kernel space module.

21. The middleware bridge method as method in claim 20, further comprising the step of noticing the kernel space bridge manager to look for a real callback function in kernel space and execute the callback function by the virtual callback function contained in virtual callback proxy during receiving a callback function execution request from the user space middleware.

* * * * *